(12) United States Patent
Eckert et al.

(10) Patent No.: US 6,459,790 B1
(45) Date of Patent: Oct. 1, 2002

(54) SYSTEM AND METHOD FOR SELECTIVE FILTER ISOLATION

(75) Inventors: Christopher Q. Eckert, Lewisville; John C. Honeycutt, Dallas, both of TX (US)

(73) Assignee: Efficient Networks, Inc., Dallas, TX (US)

(*) Notice: Subject to any disclaimer, the term of this patent is extended or adjusted under 35 U.S.C. 154(b) by 0 days.

(21) Appl. No.: 09/385,223

(22) Filed: Aug. 27, 1999

(51) Int. Cl.[7] .......................... H04M 1/76; H04M 7/00; H04M 9/00
(52) U.S. Cl. ............... 379/416; 379/399.01; 379/93.05; 379/93.09; 379/406.01; 379/406.07; 379/406.16
(58) Field of Search .................. 379/398–400, 379/399.01, 402, 418, 416, 30, 19, 168, 93.09, 405

(56) References Cited

U.S. PATENT DOCUMENTS

| | | | |
|---|---|---|---|
| 5,627,501 A | * 5/1997 | Biran et al. | |
| 5,678,198 A | * 10/1997 | Lemson | |
| 5,848,150 A | * 12/1998 | Bingel | ......................... 379/399 |
| 5,974,139 A | * 10/1999 | McNamara et al. | ........ 379/399 |
| 6,144,734 A | * 11/2000 | Beeman | ...................... 379/398 |
| 6,144,735 A | * 11/2000 | Bella | |
| 6,317,464 B1 | * 11/2000 | Le et al. | |
| 6,181,777 B1 | * 1/2001 | Kiko | ............................ 379/34 |
| 6,192,109 B1 | * 2/2001 | Amrany | ....................... 379/30 |
| 6,177,801 B1 | * 4/2001 | Chong | ....................... 324/520 |

FOREIGN PATENT DOCUMENTS

| | | | |
|---|---|---|---|
| EP | 0923221 | 6/1999 | .......... H04M/11/06 |
| WO | 98/54901 | 3/1998 | ............ H04N/7/10 |
| WO | 98/27713 | 6/1998 | ............ H04M/9/00 |

* cited by examiner

*Primary Examiner*—Forester W. Isen
*Assistant Examiner*—Ramnandan Singh
(74) *Attorney, Agent, or Firm*—Baker Botts L.L.P.

(57) ABSTRACT

In a system including a plurality of telephones coupled to an asymmetric digital subscriber line, a circuit operable to facilitate communication using the asymmetric digital subscriber line includes a filter having a corner frequency and being operable to be coupled between one of the plurality of telephones and the asymmetric digital subscriber line. The filter is also operable to attenuate transients associated with the telephone operating in an off-hook state. The circuit also includes a switch coupled to the filter. The switch is operable to effect a change in the corner frequency of the associated filter depending on whether the telephone coupled to the filter is operating in an on-hook or an off-hook state, the change in the corner frequency operating to attenuate parasitic interference associated with telephones in an on-hook state.

26 Claims, 6 Drawing Sheets

SYSTEM AND METHOD FOR SELECTIVE FILTER ISOLATION

TECHNICAL FIELD OF THE INVENTION

The present invention relates to the field of communications systems, and more particularly to a system and method for selective filter isolation in an asymmetric digital subscriber line application.

BACKGROUND OF THE INVENTION

Asymmetric digital subscriber line (ADSL) technology is a communications format designed to facilitate large downstream bandwidth (e.g. from the carrier to the customer), while leveraging the existing base of twisted pair telephone lines. ADSL provides a significant advantage over other digital subscriber line technologies in its ability to facilitate simultaneous transmission of analog voice telephony and high-speed digital transmission. In addition, by using the large existing base of twisted pair telephone lines, ADSL provides marked cost savings over other high-speed transmission alternatives, such as cable modems and fiber to the neighborhood, which require placement of new high-speed cabling for their implementation.

Full rate ADSL, sometimes referred to as "ADSL heavy," utilizes a splitter (which acts as a filter) at the customer's premises to separate the higher frequency DSL data from the lower frequency voice signals. Throughout this document, the terms "low frequency" and "high frequency" are used to denote relative frequencies, and are not intended to correspond to any particular frequency range.

Using a splitter at the customer's premises protects the DSL data from interference associated with lower frequency voice line transients caused, for example when a telephone rings. A disadvantage associated with full rate ADSL is that its installation generally requires a technician to actually go to each customer's premises ("roll a truck") and install a splitter at the customer's network interface device.

In an effort to avoid the expense of requiring a technician to install a splitter at each customer's network interface device, the industry has begun development of a lower-cost, less complex version of full ADSL, known as "ADSL Lite." The theory behind ADSL Lite is that by eliminating the need for a splitter at the network interface device, ADSL Lite eliminates the cost of sending a technician to activate the service.

In actual implementation, due to various factors, such as large variations in impedances between various manufacturers' consumer telephone equipment, both full ADSL and ADSL Lite have suffered from interference between analog voice traffic and higher frequency DSL signals. One approach to eliminating this interference is to permanently place a low pass filter in series with each telephone at the customer's premises. While this approach eliminates interference between lower frequency voice traffic and higher frequency data traffic, it has created problems of its own. For example, where a customer's premises has more than one telephone, the unterminated filters associated with on-hook telephones create resonant circuits that result in interference in the circuit of the off-hook telephone. This interference not only hinders the performance of the telephone equipment, but may also create irregularities and/or errors in the higher frequency ADSL data communicated to and from the customer's premises.

SUMMARY OF THE INVENTION

In accordance with the present invention, in a system including a plurality of telephones coupled to an asymmetric digital subscriber line, a circuit operable to facilitate communication using the asymmetric digital subscriber line comprises a filter having a corner frequency and being operable to be coupled between one of the plurality of telephones and the asymmetric digital subscriber line, and to attenuate transients associated with the telephone operating in an off-hook state. The circuit further comprises a switch coupled to the filter and operable to effect a change in the corner frequency of the associated filter depending on whether the telephone coupled to the filter is operating in an on-hook or an off-hook state, the change in the corner frequency operating to attenuate parasitic interference associated with telephones in an on-hook state.

Technical advantages of the present invention include a system and method for facilitating communications using an asymmetric digital subscriber line that reduces or eliminates low-frequency transients interfering with higher frequency ADSL data, while also reducing or eliminating parasitic interference associated with other on-hook telephones coupled to the asymmetric digital subscriber line. For example, the invention can be designed so that a telephone going on-hook causes the inductance of the unterminated filter coupled to that telephone to increase, thereby reducing the corner frequency of the unterminated filter to a point where parasitic interference associated with that unterminated filter does not affect other off-hook telephones in the system. As a further example, the invention can be designed so that a telephone going off-hook causes an increase in the capacitance of the terminated filter coupled to that telephone, lowering the corner frequency of the terminated filter to a point where the filter operates to attenuate parasitic interference associated with other on-hook telephones in the system. Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
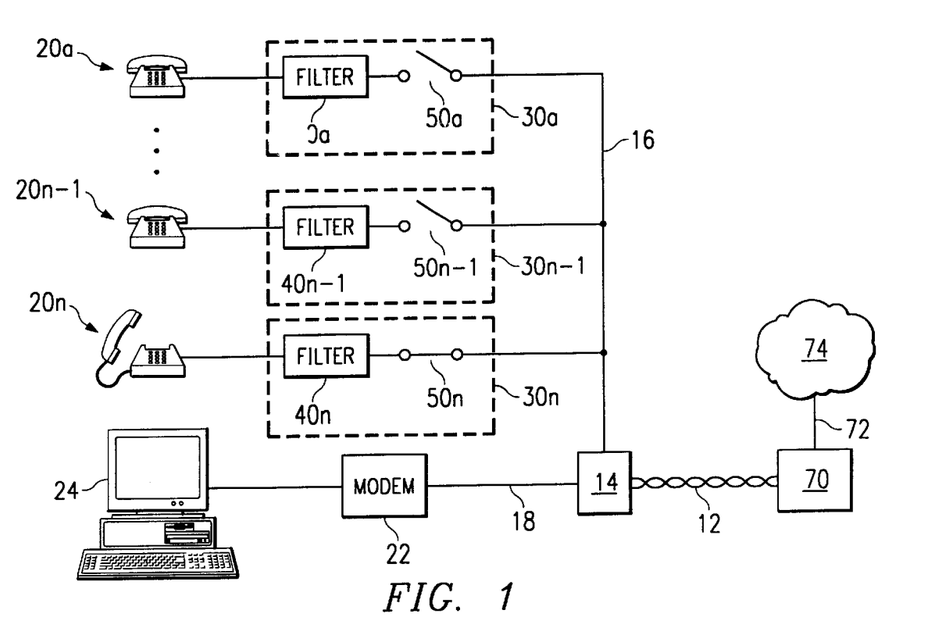
FIG. 1 is a block diagram of an exemplary communications system constructed according to the teachings of the present invention.

FIG. 1 is a block diagram of an exemplary communications system 10 constructed according to the teachings of the present invention. Communications system 10 includes an asymmetric digital subscriber line (ADSL) 12. Throughout this document, the term "asymmetric digital subscriber line" is broad enough to encompass any communication system operable to facilitate approximately simultaneous communication of both analog voice telephony signals and higher-speed digital signals. The invention applies equally to full-rate ADSL transmission as well as ADSL Lite transmission. Although this description describes the invention as it relates to particular implementations of asymmetric digital subscriber line transmission, the invention contemplates other later revisions, modifications, enhancements, or new types of approximately simultaneous analog/digital transfer techniques.

Asymmetric digital subscriber line (ADSL) 12 is coupled to a central office 70. Central office 70 couples to a network 74 over a communication link 72. Network 70 may include any suitable wireline or wireless system that supports communication between network elements using ground-based and/or space-based components. For example, network 72 may be a public switched telephone network (PSTN), an integrated services digital network (ISDN), a local area networks (LAN), a wide area network (WAN), a global computer network, such as the Internet, or other communication systems or combination of communication systems at one or more locations.

In the illustrated embodiment, asymmetric digital subscriber line 12 comprises a twisted copper pair. Asymmetric digital subscriber line 12 may alternatively comprise any communications medium operable to facilitate approximately simultaneous communication of both analog and digital signals.

In the illustrated embodiment, a network interface device 14 receives asymmetric digital subscriber line 12. Where asymmetric digital subscriber line 12 supports full rate ADSL, network interface device 14 typically includes a splitter, which separates the analog voice signals from the higher speed digital data signals. Where asymmetric digital subscriber line 12 supports ADSL Lite, asymmetric digital subscriber line 12 terminates directly into communications links 16 and 18, without using a splitter at network interface device 14.

In this embodiment, communications links 16 and 18 serve one or more telephones 20a–20n as well as a modem 22. In a particular embodiment, communications link 16 comprises an analog telephone line facilitating communications between analog telephones 20a–20n and asymmetric digital subscriber line 12. Telephones 20 may comprise any hardware, software, firmware or combination thereof operable to provide an interface between communications link 16 and a user. In the illustrated embodiment, telephones 20a and 20n-1 are depicted in an on-hook state. In other words, telephones 20a and 20n-1 are currently not in use. Telephone 20n, in contrast, is depicted in an off-hook state. In other words, telephone 20n is shown as being in use.

Where system 10 implements full rate ADSL, communications link 18 may comprise a digital communications line operable to facilitate digital communications between modem 22 and network interface device 14. In ADSL Lite applications, communications link 18 may comprise a communications link similar to communications link 16. Modem 22, which communicates via communications link 18, comprises any hardware, software, firmware, or combination thereof, operable to facilitate an interface between communications link 18 and a computer 24. Computer 24 may comprise, for example, a desktop computer, a laptop computer, a personal digital assistant, or any other computing or communicating device.

System 10 further includes circuitry 30a–30n coupled between communications link 16 and telephones 20a–20n, respectively. As used throughout this document, the term "coupled" denotes any direct or indirect communication between two or more elements. Elements said to be "coupled" to one another may, but need not be physically connected.

Operation of telephones 20 in an off-hook state sometimes generates transient signals. If these transients were allowed to propagate back to asymmetric digital subscriber line 12, they could disrupt service or otherwise cause errors in the communication of higher frequency ADSL signals. To address this issue, each circuit 30a–30n includes a filter 40a–40n, respectively, coupled to the respective telephone 20a–20n. Filters 40 can be advantageously designed to isolate asymmetric digital subscriber line 12 from the effects of these low-frequency transients. As used throughout this document, the term "isolate" refers to a reduction in the isolated element's ability to communicate or effect other circuit elements from which the element is said to be isolated during the time that the element is isolated.

In the illustrated example, filters 40 comprise low-pass filters having a corner frequency below the frequency of the lowest frequency ADSL signals. Filters 40 could alternatively comprise band-pass filters, or any other types of filters operable to protect ADSL signals from transients associated with telephones 20 in an off-hook state. Filters 40 operate to attenuate low frequency transients associated with off-hook operation, preventing those transients from propagating back to asymmetric digital subscriber line 12 and disrupting the ADSL signals.

In systems that include more than one telephone 20, telephones 20 in an off-hook state can experience parasitic interference when one or more other telephones 20 remains in an on-hook state. This parasitic interference stems from the fact that each filter 40 is typically designed to terminate with an impedance approximately equal to the off-hook impedance of the telephone 20. When filters 40 are coupled to telephones in an on-hook state—a state resulting in a different impedance than the off-hook impedance of the telephone—they are not properly terminated and generally result in a resonant circuit that generates parasitic interference. If left unchecked, the parasitic interference created by the non-terminated on-hook telephones 20 can disrupt the operation of the off-hook telephones 20 and may also adversely affect the higher frequency ADSL signals.

To address this issue, each circuit 30a–30n also includes a switch 50a–50n, respectively, coupled to an associated filter 40a–40n. In the illustrated embodiment, each switch 50 is coupled between an associated filter 40 and communication link 16. Alternatively, switch 50 could be coupled between filter 40 and telephone 20, or in parallel with telephone 20, filter 40, or a portion thereof. Switches 50 comprise circuitry operable to manipulate the corner frequency of associated filters 40 depending on the state of the associated telephone 20. Through this operation, telephones 20 operating in an off-hook state are isolated from parasitic interference caused by unterminated filters 40 coupled to telephones 20 operating in an on-hook state. In addition, each switch 50 is designed to ensure that transients generated by telephones 20 operating in an off-hook state continue to be attenuated by associated filters 40, thus reducing or eliminating disruption of higher frequency digital signals.

As a result, system 10 provides an advantage of protecting asymmetric digital subscriber line 12 from low frequency transients typically associated with telephones 20 in an off-hook state, while reducing or eliminating parasitic interference associated with resonant circuits created when one or more telephones 20 remain in an on-hook state. Through, for example, appropriate choice of system components determining the corner frequencies of filters 40, system 12 can be implemented without disrupting on-hook services, such as "caller ID" and "call-waiting ID," to telephones 20 remaining on-hook.

Figure 2:
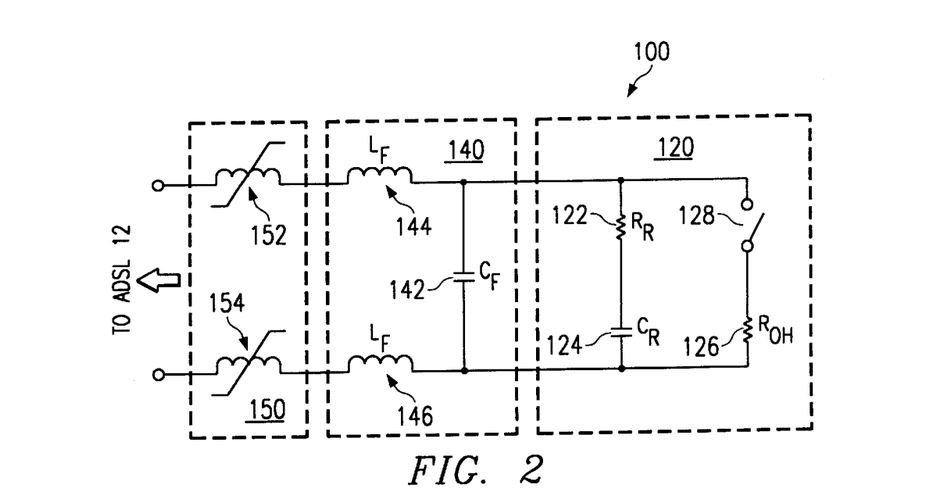
FIG. 2 is a schematic diagram of an exemplary circuit useful, for example, in practicing the present invention in an ADSL Lite application.

FIG. 2 is a schematic diagram of an exemplary circuit 100 useful, for example, in practicing the present invention in an ADSL Lite application. Circuit 100 includes a telephone 120 coupled to an asymmetric digital subscriber line (ADSL) 12. Circuit 100 further includes a filter 140 and a switch 150 coupled between telephone 120 and asymmetric digital subscriber line 12.

Telephone 120 shown in FIG. 2 represents an equivalent circuit of telephone 20 shown in FIG. 1. In the equivalent circuit of telephone 120, a ringer resistance ($R_R$) 122 and a ringer capacitance ($C_R$) 124 together represent the ringer load of telephone 120. An off-hook resistance ($R_{OH}$) 126 represents the off-hook impedance associated with telephone 120. A switch 128 represents the hook switch of telephone 120. Switch 128 remains open while telephone 120 is in an on-hook state. When telephone 120 goes off-hook, switch 128 closes.

Filter 140 is coupled between telephone 120 and asymmetric digital subscriber line 12. The components of filter 140 are selected to give filter 140 a corner frequency sufficient to isolate asymmetric digital subscriber line 12 from low frequency transients typically associated with telephone 120 operating in an off-hook state.

In the illustrated embodiment, filter 140 includes filter inductances ($L_F$) 144 and 146 coupled in series with communications link 16, and a filter capacitance ($C_F$) 142 coupled in series with filter inductances 142 and 144. In the illustrated embodiment, filter 140 comprises an even order filter having filter capacitance 142 coupled in parallel with telephone 120. This configuration provides an advantage of filter capacitance 142 acting to moderate nonlinearities associated with hook switch 128.

In this embodiment, switch 150 comprises a pair of saturable core inductors 152 and 154. Although the illustrated embodiment utilizes two separate saturable core inductors 152 and 154, these separate inductors could be combined using a single inductor having two windings. Saturable core inductors 152 and 154 are designed to saturate (e.g., their impedance approaches zero) upon introduction of a particular current level. Prior to being exposed to a saturating direct current, saturable core inductors 152 and 154 exhibit a particular inductance or impedance ($L_{SC}$). In this embodiment, saturable core inductors 152 and 154 are designed to saturate upon introduction of a current drawn when an associated telephones 120 operating in an off-hook state. In the illustrated embodiment, this current comprises a 25 milliamp current.

The saturating current level of saturable core inductors 152 and 154 can be determined through various design criteria, such as, the permeability of the inductor's core material, the shape of the inductor, and the type and number of windings. In the illustrated embodiment, each saturable core inductor 152 and 154 comprises a non-gapped toroid inductor having a core material exhibiting an approximately square hysteresis characteristic, such as ferrite having a permeability of 900μ. Saturable core inductors 152 and 154 may each include, for example, approximately 100 turns of AWG 26 wire. Other configurations and materials could be used without departing from the scope of the invention.

In the illustrated embodiment, saturable core inductors 152 and 154 are coupled in series with filter 140 so that the inductance ($L_{SC}$) of saturable core inductors 152 and 154 adds to the inductance ($L_F$) of filter inductors 144 and 146. Prior to application of a saturating current, filter 140 exhibits a corner frequency of:

$$1/(2\pi)((L_{SC}+L_F)C_F)^{1/2}.$$

Upon introduction of a saturating current, the inductance $L_{SC}$ falls to near zero, driving the corner frequency of filter 140 to:

$$1/(2\pi)(L_F C_F)^{1/2}.$$

Through appropriate component selection, each circuit 100 can be designed to isolate asymmetric digital subscriber line 12 from transients associated with telephones 120 operating in an off-hook state, while also reducing or eliminating parasitic interference associated with other telephones 120 remaining in an on-hook state. For example, the inductance ($L_{SC}$) of saturable core inductors 152 and 154 can be selected to provide a relatively high impedance, so that while the associated telephone 120 remains on-hook (e.g., no saturating current) the corner frequency of filter 140 remains relatively low to attenuate parasitic interference caused by the unterminated nature of filter 140 while telephone 120 is on-hook.

In addition, telephones 120 operating in an off-hook state will introduce a saturating current to saturable core inductors 152 and 154, driving their inductance ($L_{SC}$) near zero. This increases the corner frequency of filter 140 coupled to the off-hook telephone 120 to a level where voice level frequencies are allowed to pass, while transients associated with the off-hook telephone 120 are prevented from interfering with higher frequency ADSL information.

The impedance of saturable core inductors 152 and 153 may further be selected so as to isolate asymmetric digital subscriber line 12 from filter 140 and telephone 120 in an on-hook state. This may be desirable, for example to minimize attenuation of higher frequency digital signals. In general, the greater the number of telephones 20 connected in parallel to one another, the lower the impedance of their parallel combination. Setting the impedance of saturable core inductors 152 and 153 sufficiently high can help reduce or eliminate attenuation of higher frequency digital signals, which might otherwise occur where several telephones 20 are coupled in parallel with asymmetric digital subscriber line 12.

Figure 3:
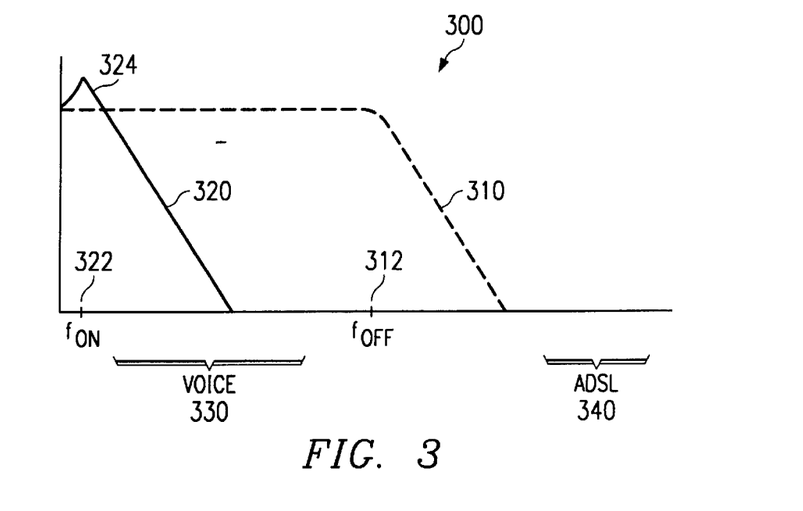
FIG. 3 is a frequency plot showing an exemplary frequency responses of terminated filters associated with off-hook telephones and unterminated filters associated with on-hook telephones according to the teachings of the present invention.

FIG. 3 is a rough frequency plot showing an exemplary frequency response 310 of terminated filters 140 associated with off-hook telephones 120, and a frequency response 320 of unterminated filters 140 associated with on-hook telephones 120. Components of filter 140 can be selected to provide any desired frequency response. As graphically shown in FIG. 3, while telephone 120 operates in an off-hook state, filter 140 exhibits a corner frequency 312 of $f_{off}$ and allows voice frequency level signals 330 to pass, while attenuating any transients that could adversely affect higher frequency ADSL information 340. In addition, filters 140 associated with telephones 120 operating in an on-hook state exhibit a corner frequency 322 of $f_{on}$ which reduces or eliminates parasitic interference 324 associated with the unterminated nature of those filters 140.

Figure 4:
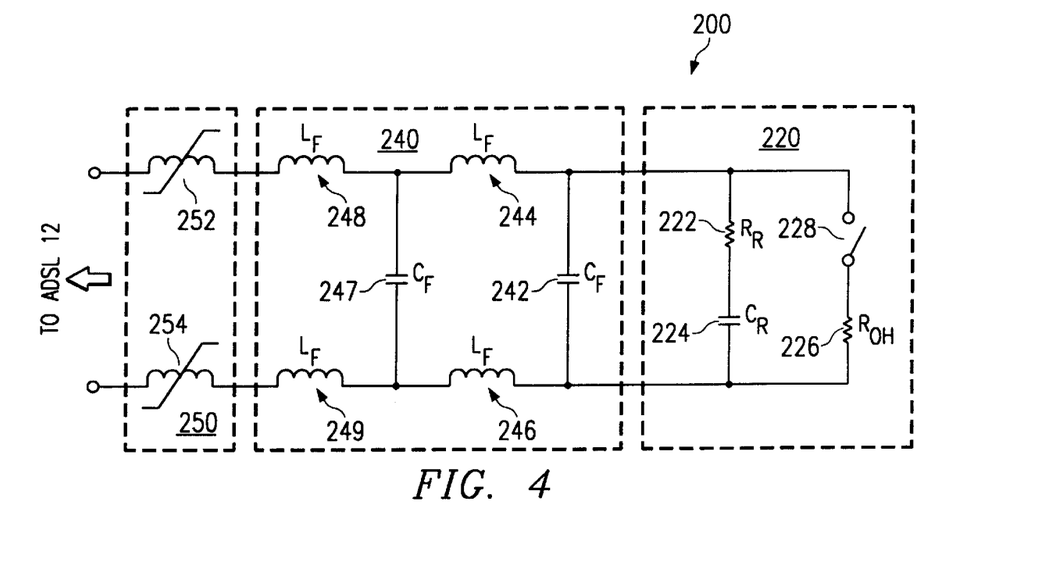
FIG. 4 shows a schematic diagram of an exemplary circuit useful, for example, in practicing the present invention in a full rate ADSL application.

Like circuit 100 shown in FIG. 2, circuit 200 includes a telephone 220 coupled to asymmetric digital subscriber line 12. Circuit 200 further includes a filter 240 and a switch 250 coupled between telephone 220 and asymmetric digital subscriber line 12. Telephone 220 and switch 250 are similar in structure and function to telephone 120 and switch 150 of circuit 100 in FIG. 2. Filter 240 is also similar in function to filter 140 of circuit 100. To better facilitate operation under full rate ADSL, however, filter 240 comprises a fourth order filter. Like filter 140 in circuit 100, filter 240 can be advantageously designed to couple one or more capacitors 242 and 247 in parallel with telephone 20 to moderate nonlinearities typically associated with hook switch 228.

As an example of component values that could be selected in circuit 200, each of saturable core inductors 252 and 254 could each comprise, for example, an approximately 8 milli-Henry inductor; filter inductances 244–249 could each comprise, for example, an approximately 8.6 milli-Henry inductor; and filter capacitances 242 and 247 could each comprise, for example, an approximately 0.022 micro-Farad capacitor. The configuration and component values of filter 240 and switch 250 are presented for illustrative purposes only. Other configurations and component values could be used without departing from the scope of the invention.

Figure 5:
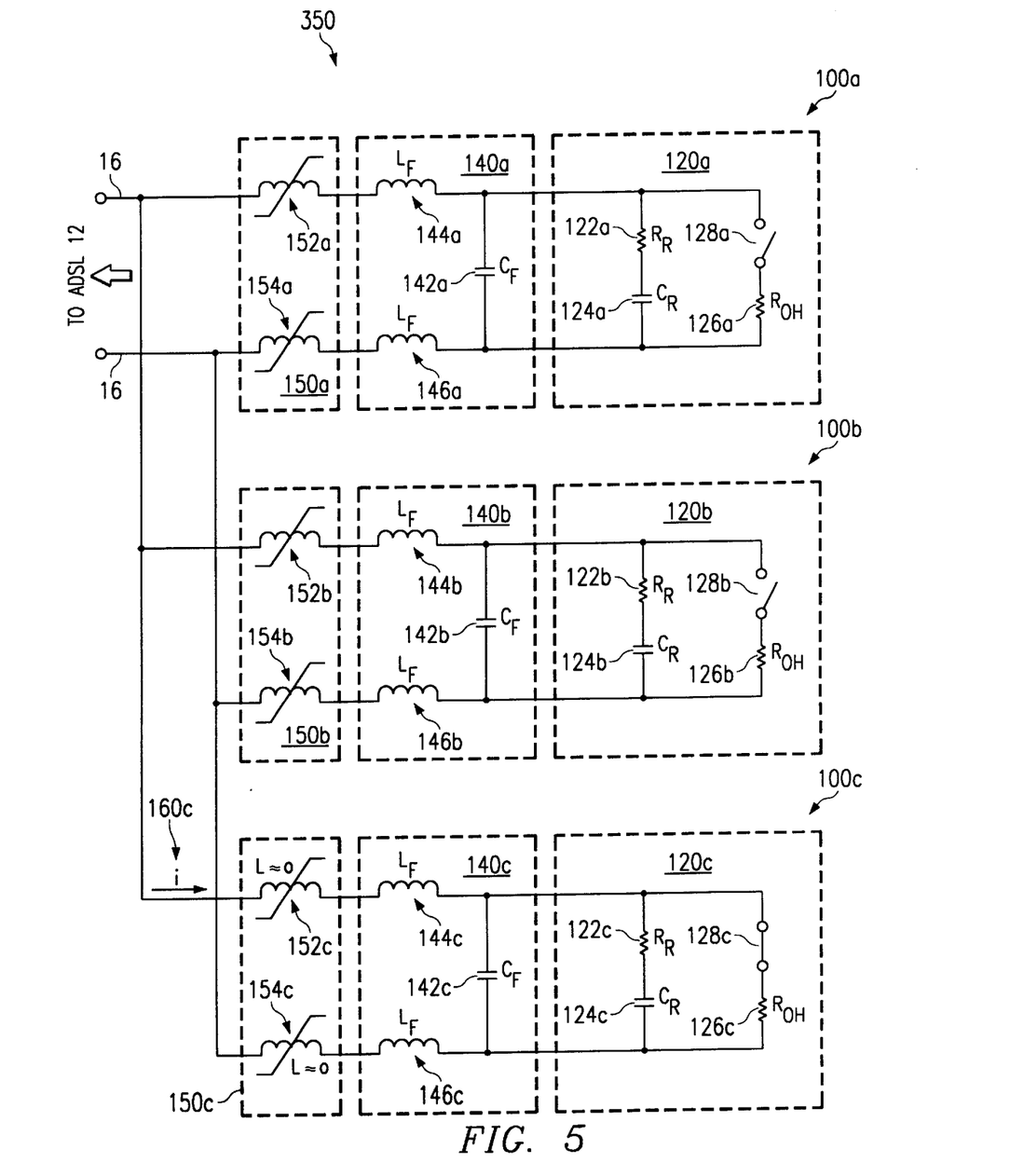
FIG. 5 is a schematic diagram of circuitry operable to facilitate communications using an asymmetric digital subscriber line and a plurality of telephones according to the teachings of the present invention.

FIG. 5 is a schematic diagram of circuitry 350 operable to facilitate communications using an asymmetric digital subscriber line and a plurality of telephones 120.

Circuitry 300 includes a plurality circuits 100 (each identical to circuit 100 depicted in FIG. 2) coupled in parallel with communications link 16. The illustrated embodiment includes three circuits 100a–100c. Any number of circuits 100 could be used without departing from the scope of the invention.

Telephones 120, filters 140, and switches 150 are identical in structure and function to like numbered elements described with reference to FIG. 2. Each telephone 120 includes a ringer load, represented by ringer resistance 122 and ringer capacitance 124. Each telephone 120 also includes a hook switch 128 and off-hook ringer impedance 126.

Each filter 140 includes first filter elements 144 and 146 coupled in series with communications link 16, and a second filter element 142 coupled in series with first filter elements 144 and 146 and in parallel with telephone 120. In this embodiment, first filter elements 144 and 146 comprise inductors, and second filter element 142 comprises a capacitor. Component values of first filter elements 144 and 146 and second filter element 142 can be selected to provide desired filter characteristics, depending on the particular application.

Each switch 150 comprises a pair of saturable core inductors 152 and 154. Saturable core inductors 152 and 154 have an impedance sufficient to isolate filter 140 from the rest of circuit 350 when the associated telephone 120 is in an on-hook state. Upon introduction of a saturating current, each saturable core inductor 152 and 154 saturates, driving its impedance to near zero, and increasing the corner frequency of the associated filter 140. In the illustrated embodiment, saturable core inductors 152 and 154 are designed to saturate upon an introduction of a current drawn when the associated telephone 120 goes off-hook (e.g., when hook switch 128 closes). In the illustrated embodiment, this current, may comprise, for example, 25 milli-amps.

In the example shown in FIG. 5, telephones 120a and 120b are depicted as being in an on-hook state. In other words, telephones 120a and 120b are not currently in use. The on-hook state is shown in FIG. 5 by open hook switches 128a and 128b. Telephone 120c, in contrast, is depicted as being in an off-hook state. The off-hook state is shown by closed switch 128c. When telephone 120c is in an off-hook state, there is a potential that low-frequency transients will be created at telephone 120c. It is desirable to ensure that these low-frequency transients are not promulgated to asymmetric digital subscriber line 12. Circuit 300 accomplishes this objective through the cooperation of filter 140c and switch 150c.

Prior to telephone 120c going off-hook, saturable core inductors 152c and 154c are in a relatively high impedance state, which results in a relatively low corner frequency of the associated filter 140c. When telephone 120c goes off-hook and hook switch 128c closes, circuit 130c draws a current 160c associated with the off-hook state of telephone 120c.

Circuit 100c is designed such that the current 160c associated with an off-hook condition of telephone 120c operates to saturate saturable core inductors 152c and 154c. When saturable core inductors 152c and 154c saturate, their impedance is driven near zero, and the corner frequency of the associated filter is increased. This reduces or eliminates the isolating effects of switch 150c and allows voice frequency level signals to pass. At the same time, the corner frequency of filter 140c remains low enough to isolate asymmetric digital subscriber line 12 from transients caused by off-hook operation of telephone 120c. In this embodiment, filter 140c acts as a low-pass filter, preventing any low-frequency transients created at telephone 120c from promulgating to asymmetric digital subscriber line 12.

While circuit 350 protects asymmetric digital subscriber line 12 from low-frequency transients associated with telephone 120c in an off-hook state, circuit 350 also reduces or eliminates parasitic interference that would otherwise be caused by telephones 120a and 120b, which remain in an on-hook state. Because telephones 120a and 120b remain in an on-hook state, hook switches 128a and 128b remain open. As a result, circuits 100a and 100b do not draw additional current associated with an off-hook conditions of telephones 120a and 120b. Consequently, saturable core inductors 152 and 154 of each circuit remain in a relatively high impedance state, resulting in a relatively low corner frequency of filters 140a and 140b. This relatively high impedance of saturable core inductors 152 and 154 and resulting low corner frequency of filters 140a and 140b operates to reduce or eliminate parasitic interference to the off-hook phone 120c.

Although this example describes an embodiment including three telephones 120, only one of which is off-hook, the invention is not so limited. The invention can be applied to any number of telephones 120 and will protect asymmetric digital subscriber line 12 from any number of simultaneously off-hook telephones.

Figure 6:
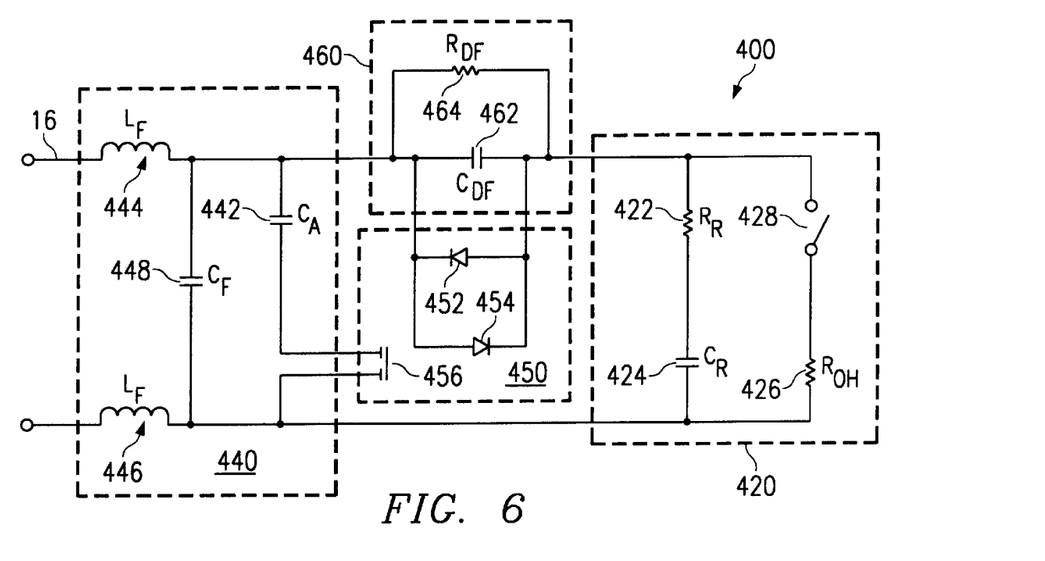
FIG. 6 shows a schematic diagram of an exemplary circuit useful, for example, in practicing the present invention in an ADSL Lite application.

FIG. 6 shows a schematic diagram of an exemplary circuit 400 useful, for example, in practicing the present invention in an ADSL Lite application. Circuit 400 includes a telephone 420 coupled to communications link 16. A filter 440 and a switch 450 are coupled between telephone 420 and communications link 16. Telephone 420 represents an equivalent circuit of telephone 20 shown in FIG. 1. Telephone 420 includes a ringer load comprising ringer resistance 422 and ringer capacitance 424. Telephone 420 also includes a hook switch 428 and an off-hook ringer impedance 426.

In the illustrated embodiment, filter 440 comprises a second order filter having first filter elements 444 and 446 and a second filter element 448. In this particular embodiment, first filter elements comprise inductors ($L_F$) coupled in series with communications link 16. In the illustrated embodiment, second filter element 448 comprises a filter capacitor ($C_F$) coupled in series with first filter elements 444 and 446, and in parallel with telephone 420. Coupling a capacitor in parallel with telephone 420 is generally advantageous to moderate nonlinearities caused by hook switch 428. The illustrated embodiment of filter 440 is only one example of a design applicable to the present invention. Other configurations and components could be used without departing from the scope of the invention.

In the illustrated embodiment, switch 450 includes a pair of light emitting diodes 452 and 454. Any number of diodes could be used without departing from the scope of the invention. Switch 450 also includes a photo detector 456. Photo detector 456 may comprise, for example, a photo detecting metal-oxide-semiconductor field effect transistor (photo-MOSFET). Any device operable to conduct upon introduction of a light source could be used without departing from the scope of the invention. Photo detector 456 is coupled to an attenuating capacitor 442.

Circuit 400 further includes a diode switching filter 460. Diode switching filter 460 includes a diode filter capacitor ($C_{DF}$) 462 and a diode filter resistor ($R_{DF}$) 464 each coupled in parallel with diodes 452 and 454. Diode switching filter 460 operates to attenuate nonlinearities that may be generated by diodes 452 and 454 switching due to, for example, dial pulsing, ringing, or off-hook operation of telephone 420.

Circuit 400 is designed so that light emitting diodes do not conduct while telephone 420 is in an on-hook state, but do conduct while telephone 420 is in an off-hook state. In operation, while telephone 420 is in an on-hook state, light emitting diodes 452 and 454 do not conduct. While light emitting diodes 452 and 454 remain non-conductive, photo detector 456 also remains non-conductive, eliminating attenuating capacitor 442 from the circuit of filter 440. Thus, while telephone 420 remains on-hook, filter 440 comprises the combination of filter inductors 444 and 446 and filter capacitor 449, resulting in a corner frequency of:

$$1/(2\pi)(L_F C_F)^{1/2}$$

Circuit 400 is further designed so that light emitting diodes 452 and 454 conduct when the associated telephone 420 goes off-hook. When light emitting diodes 452 and 454 conduct, photo detector 456 conducts and brings attenuating capacitor 442 into the circuit of filter 440. Therefore, while telephone 420 goes off-hook, the corner frequency of filter 440 is reduced to:

$$1/(2\pi)(L_F(C_F+C_A))^{1/2}$$

Through appropriate component selection, the corner frequency of filter 440 during off-hook operation of telephone 420 can be selected to allow voice frequency level signals to pass, while attenuating higher frequency parasitic interference associated with other on-hook telephones 420 in the system.

Figure 7:
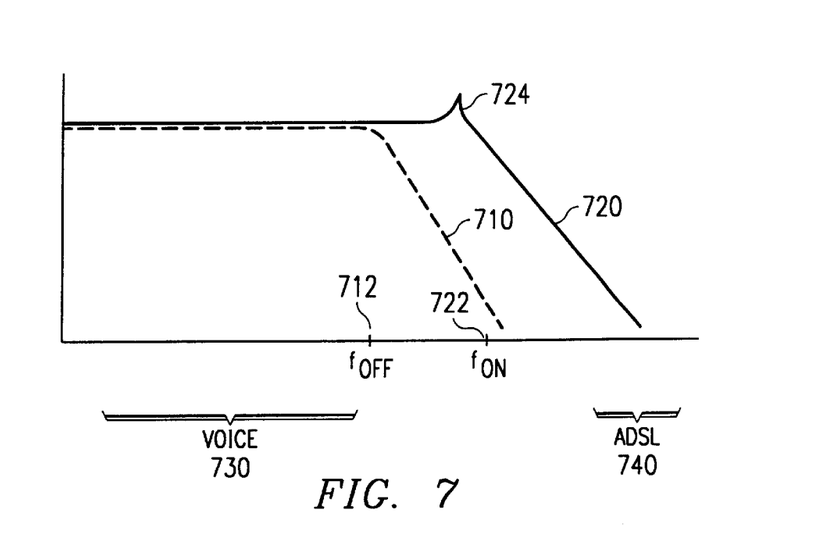
FIG. 7 is a frequency plot showing an exemplary frequency responses of terminated filters-associated with off-hook telephones and unterminated filters associated with on-hook telephones according to the teachings of the present invention.

FIG. 7 is a rough frequency plot 700 showing an exemplary frequency response 710 of terminated filters 440 associated with off-hook telephones 420, and a frequency response 720 of unterminated filters 440 associated with on-hook telephones 420. Components of filter 440 can be selected to provide any desired frequency response. As graphically shown in FIG. 7, while telephone 420 operates in an off-hook state, filter 440 exhibits a corner frequency 712 of $f_{off}$ and allows voice frequency level signals 730 to pass, while attenuating any transients that could adversely affect higher frequency ADSL information 740. In addition, parasitic interference associated with unterminated filters 440 coupled to telephones 420 operating in an on-hook state does not affect telephones 420 operating in an off-hook state because that interference occurs at a frequency 722 $f_{on}$ higher than the corner frequency of the filters 440 associated with the off-hook telephones 420.

Circuit 400, therefore, provides a filter 440 operable to isolate asymmetric digital subscriber line 12 from low-frequency transients generated during off-hook operation of telephone 420, while also attenuating parasitic interference associated with other telephones 420 remaining in an on-hook state.

Figure 8:
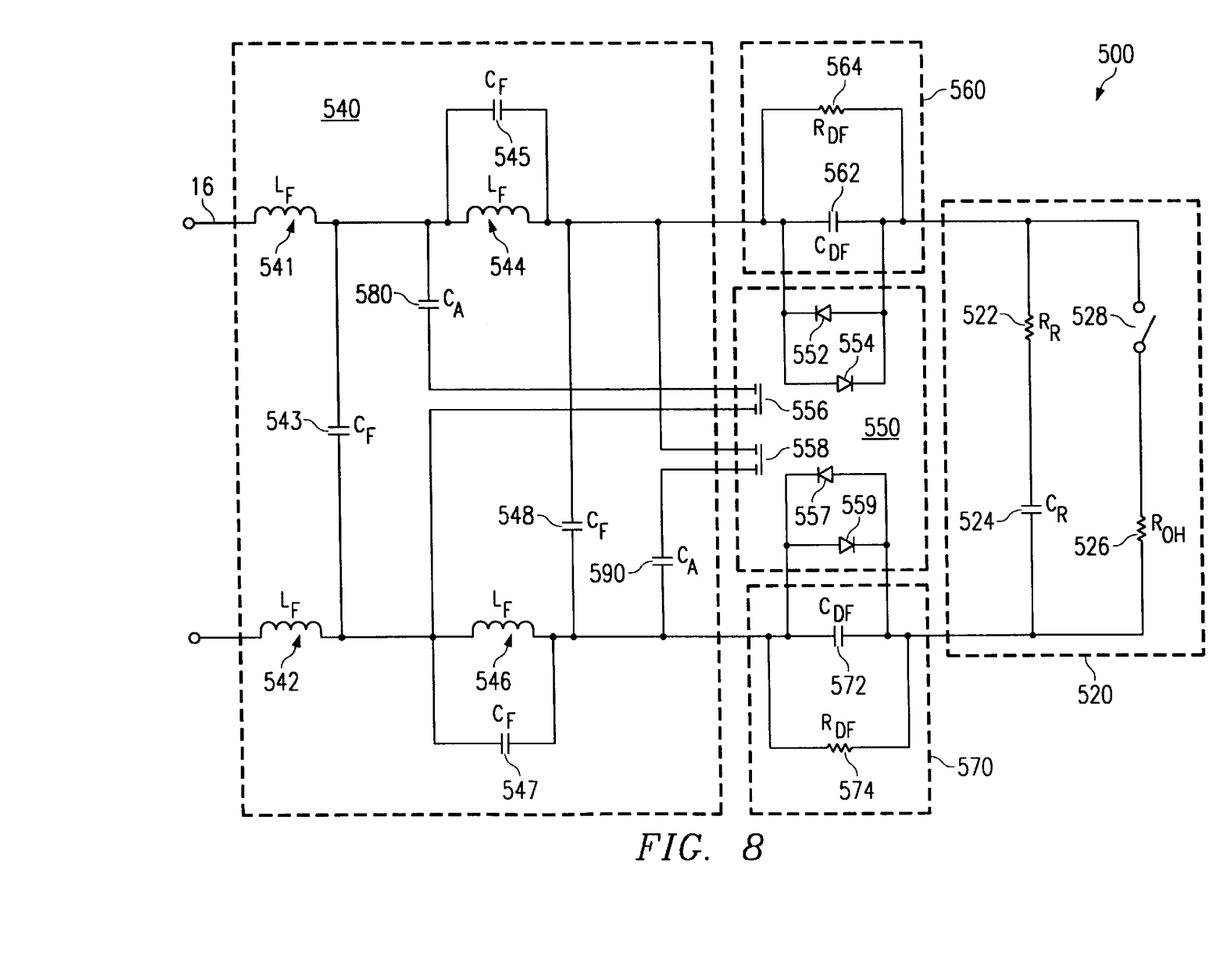
FIG. 8 is a schematic diagram of another embodiment of a circuit useful, for example, in practicing the present invention in a full rate ADSL application.

FIG. 8 is a schematic diagram of another embodiment of a circuit 500 useful, for example, in practicing the present invention in a full rate ADSL application. Like circuit 400 shown in FIG. 6, circuit 500 includes a telephone 520 coupled to asymmetric digital subscriber line 12. Circuit 500 further includes a filter 540 and a switch 550 coupled between telephone 520 and asymmetric digital subscriber line 12. Telephone 520 is similar in structure and function to telephone 420 of circuit 400 in FIG. 6.

Filter 540 is similar in function to filter 440 of circuit 400. To better facilitate operation under full rate ADSL, however, filter 440 comprises a fourth order filter. Like filter 440 in circuit 400, filter 540 can be advantageously designed to couple one or more filter capacitors 543 and 548 in parallel with telephone 20 to moderate nonlinearities typically associated with hook switch 528.

Switch 550 is also similar in structure and function to switch 450 of circuit 400. Switch 550 includes a pair of light emitting diodes 552 and 554 and a pair of light emitting diodes 557 and 559 all coupled to communications link 16. Circuit 500 is designed so that light emitting diodes 552, 554, 557, and 559 only conduct while telephone 520 is in an off-hook state. Switch 550 also includes photo detectors 556 and 558, which are coupled to attenuating capacitors 580 and 590, respectively. Although the illustrated embodiment shows the use of two sets of light emitting diodes 552, 554 and 557,559, a single pair of light emitting diodes could be used to activate both photo detectors 556 and 558 without departing from the scope of the present invention.

As an example of component values that could be selected in circuit 500, filter inductances 541, 542, 544, and 546 could each comprise, for example, an approximately 8.6 milli-Henry inductor; filter capacitance 543 could comprise, for example, an approximately 0.01 micro-Farad capacitor; filter capacitance 548 could comprise, for example, an approximately 0.022 micro-Farad capacitor; filter capacitances 545 and 547 could each comprise, for example, an approximately 3300 pico-Farad capacitor; attenuating capacitance 580 could comprise, for example, an approximately 0.047 micro-Farad capacitor; and attenuating capacitance 590 could comprise, for example, an approximately 0.0056 micro-Farad capacitor. The configuration and component values of circuit 500 are presented for illustrative purposes only. Other configurations and component values could be used without departing from the scope of the invention.

Circuit 500 further includes diode switching filters 560 and 570. Diode switching filter 560 includes a diode filter capacitor ($C_{DF}$) 562 and a diode filter resistor ($R_{DF}$) 564 each coupled in parallel with diodes 552 and 554. Similarly, diode switching filter 570 includes a diode filter capacitor ($C_{DF}$) 572 and a diode filter resistor ($R_{DF}$) 574 each coupled in parallel with diodes 557 and 559. Diode switching filters 560 and 570 operate to attenuate nonlinearities that may be generated by diodes 552, 554, 557, and 559 switching due to, for example, dial pulsing, ringing, or off-hook operation of telephone 520.

In operation, light emitting diodes 552, 554, 557, and 559 and, therefore, also photo detectors 556 and 558, remain non-conductive while telephone 520 remains on-hook. This effectively isolates attenuating capacitors 580 and 590 from filter 540 while telephone 520 is on-hook. When telephone 520 goes off-hook, light emitting diodes 552, 554, 557, and 559 conduct, causing photo detectors 556 and 558 to also conduct, which brings attenuating capacitors 580 and 590 into filter 540. This reduces the corner frequency of filter 540 while telephone 520 remains off-hook.

As with circuit 400, circuit 500, therefore, provides a filter 540 operable to isolate asymmetric digital subscriber line 12 from low-frequency transients generated during off-hook operation of telephone 520, while also attenuating parasitic interference associated with filters 540 coupled to on-hook telephones in the system.

Figure 9:
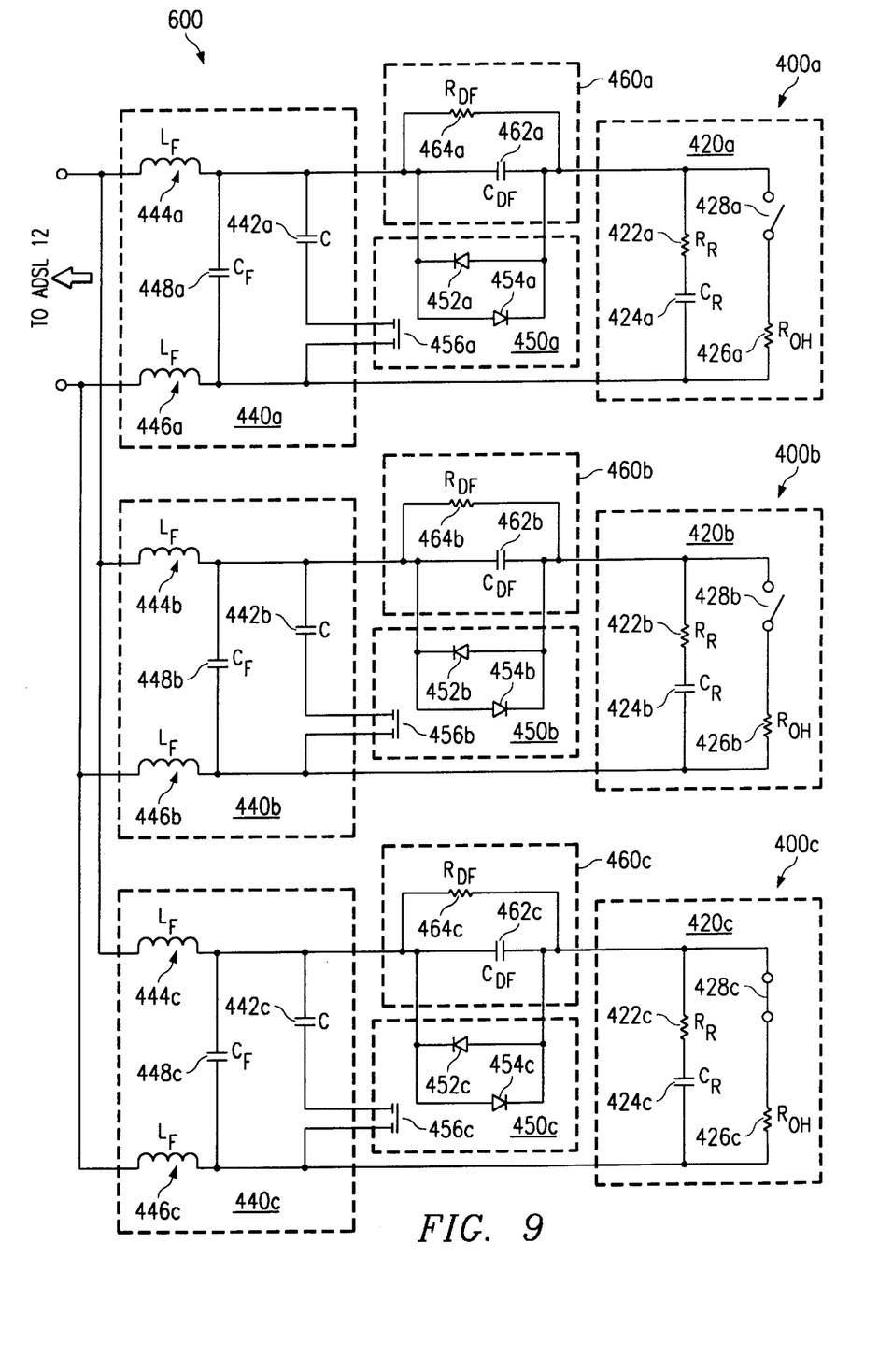
FIG. 9 is a schematic diagram of circuitry operable to facilitate communications using an asymmetric digital subscriber line and a plurality of telephones according to the teachings of the present invention.

FIG. 9 is a schematic diagram of circuitry 600 operable to facilitate communications using an asymmetric digital subscriber line and a plurality of telephones 420. Circuitry 600 includes a plurality circuits 400 (each identical to circuit 400 depicted in FIG. 6) coupled in parallel with communications link 16. The illustrated embodiment includes three such circuits 400a–400c. Any number of circuits 400 could be used without departing from the scope of the invention.

Telephones 420, filters 440, and switches 450 are identical in structure and function to like numbered elements described with reference to FIG. 6. Each telephone 420 includes a ringer load, represented by ringer resistance 422 and ringer capacitance 424. Each telephone 420 also includes a hook switch 428 and an off-hook ringer impedance 426.

Each filter 440 includes first filter elements 444 and 446 coupled in series with communications link 16, and a second filter element 448 coupled in series with first filter elements 444 and 446 and in parallel with telephone 420. In this embodiment, first filter elements 444 and 446 comprise filter inductors, and second filter element 448 comprises a filter capacitor. Component values of first filter elements 444 and 446 and second filter element 442 can be selected to provide desired filter characteristics, depending on the particular application.

Each switch 450 comprises a pair of light emitting diodes 452 and 454. Each switch 450 further includes a photo detector 456 coupled to an attenuating capacitor 442. Each circuit 400 is designed so that light emitting diodes 452 and 454 and, therefore, photo detector 456 conduct only when telephone 420 is off-hook. In this way, attenuating capacitor 442 becomes an active circuit element only when telephone 420 is off-hook. When telephone 420 is on-hook, attenuating capacitor 442 becomes effectively isolated from the rest of circuit 600. Through this configuration, the corner frequency of filters 440 associated with telephones 420 operating in an off-hook state is lower than the corner frequency of filters 440 associated with telephones 420 operating in an on-hook state. Through appropriate component selection, the corner frequency of filter 440 during off-hook operation of telephone 420 can be selected to allow voice frequency level signals to pass, while attenuating higher frequency parasitic interference associated with other on-hook telephones 420 in the system.

In the example shown in FIG. 9, telephones 420a and 420b are depicted as being in an on-hook state. In other words, telephones 420a and 420b are not currently in use. Telephone 420c, in contrast, is depicted as being in an off-hook state. When telephone 420c is in an off-hook state, there is a potential that low-frequency transients will be created at telephone 420c, which could cause errors or irregularities in digital information communicated over asymmetric digital subscriber line 12. It is, therefore, desirable to ensure that these low-frequency transients are not promulgated to asymmetric digital subscriber line 12. Circuit 600 accomplishes this objective through the cooperation of filters 440 and switches 450.

Prior to telephone 420c going off-hook, light emitting diodes 452 and 454 and photo detector 456 do not conduct, which effectively isolate attenuating capacitor 442 from the rest of circuit 600. When telephone 420c goes off-hook and hook switch 428c closes, the threshold voltage of light emitting diodes 452 and 454 is exceeded, causing them to conduct and emit light. This activates photo detector 456, bringing attenuating capacitor 442 into filter 440c, and reducing the corner frequency of filter 440c. At that point, filter 440c operates to isolate asymmetric digital subscriber line 12 from any low-frequency transients generated by off-hook telephone 420.

While circuit 600 protects asymmetric digital subscriber line 12 from low-frequency transients associated with telephone 420c in an off-hook state, circuit 600 also reduces or eliminates parasitic interference that would otherwise be caused by unterminated filters 440 associated with telephones 420a and 420b remaining in an on-hook state. Because telephones 420a and 420b remain in an on-hook state, hook switches 428a and 428b remain open. As a result, light emitting diodes 452 and 454 and photo detector 456 remain non-conductive and attenuating capacitor 442 remains isolated from the rest of circuit 600. This results in the parasitic interference associated with unterminated filters 440a and 440b associated with on-hook telephones 420a and 420b, respectively, occurring at a frequency above the corner frequency of filter 440c associated with off-hook telephone 420c. This arrangement, therefore, reduces or eliminates the effects of the parasitic interference on off-hook telephone 420c.

Although this example describes an embodiment including three telephones 420, only one of which is off-hook, the invention is not so limited. The invention can be applied to any number of telephones 420 and will protect asymmetric digital subscriber line 12 from any number of simultaneously off-hook telephones.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. In a system including a plurality of telephones coupled to an asymmetric digital subscriber line, a circuit operable to facilitate communication using the asymmetric digital subscriber line comprises:

a filter having a corner frequency and being operable to be coupled between one of the plurality of telephones and the asymmetric digital subscriber line, and to attenuate transients associated with at least another of the plurality of telephones operating in an off-hook state; and a switch coupled to the filter and operable to effect a change in the corner frequency of the associated filter depending on whether the one of the plurality of telephones coupled to the filter is operating in an on-hook or an off-hook state, the change in the corner frequency operating to attenuate parasitic interference associated with the one of the plurality of telephones in an on-hook state when the at least another of the plurality of telephones switches to an off-hook state.

2. The circuit of claim 1, wherein the filter comprises a first filter element operable to be coupled in series between the asymmetric digital subscriber line and the one of the plurality of telephones; and a second filter element coupled in series with the first filter element and operable to be coupled in parallel with the one of the plurality of telephones.

3. The circuit of claim 2, wherein the first filter element comprises a filter inductor and wherein the second filter element comprises a filter capacitor.

4. The circuit of claim 3, wherein the switch is coupled in series with an attenuating capacitor coupled in parallel with the filter capacitor, and wherein the switch operates to remain open while the telephone is in an on-hook state to eliminate the attenuating capacitor from the circuit increasing the corner frequency of the filter, and to conduct while the one of the plurality of telephones is in an off-hook state to include the attenuating capacitor in the circuit reducing the corner frequency of the filter.

5. The circuit of claim 4, wherein the switch comprises:

a light emitting diode operable to be coupled between the asymmetric digital subscriber line and the one of the plurality of telephones and to illuminate only when the one of the plurality of telephones is in an off-hook state; and a photo detector switch coupled to the attenuating capacitor and operable to conduct to couple the attenuating capacitor to the filter in response to the light emitting diode illuminating when the one of the plurality of telephones is in an off-hook state.

6. The circuit of claim 1, wherein the change in the corner frequency of the associated filter comprises a reduction in the corner frequency when a telephone coupled to the filter is operating in an off-hook state, the reduction in corner frequency operating to attenuate parasitic interference associated with telephones in an on-hook state.

7. A system operable to facilitate communications over an asymmetric digital subscriber line, comprising:

a modem operable to be coupled to an asymmetric digital subscriber line to facilitate communication of data messages over the asymmetric digital subscriber line; and a plurality of filters, each having a corner frequency and being operable to be coupled between one of a plurality of telephones and the asymmetric digital subscriber line, and to attenuate transients associated with ones of the telephones operating in an off-hook state; and a plurality of switches, each coupled to one of the plurality of filters and operable to effect a change in the corner frequency of the associated filter depending on whether the telephone coupled to the filter is operating in an on-hook or an off-hook state, the change in the corner frequency operating to attenuate parasitic interference associated with telephones in an on-hook state when at least one of the plurality of telephones switches to an off-hook state.

8. The system of claim 7, wherein at least one filter comprises a first filter element operable to be coupled in series between the asymmetric digital subscriber line and the telephone; and a second filter element coupled in series with the first filter element and operable to be coupled in parallel with the telephone.

9. The system of claim 8, wherein the first filter element comprises a filter inductor and wherein the second filter element comprises a filter capacitor.

10. The system of claim wherein at least one of the plurality of switches is coupled in series with an attenuating capacitor coupled in parallel with the filter capacitor, and wherein the at least one switch operates to remain open while the telephone is in an on-hook state to eliminate the attenuating capacitor from the circuit increasing the corner frequency of the filter, and to conduct while the telephone is in an off-hook state to include the attenuating capacitor in the circuit reducing the corner frequency of the filter.

11. The system of claim wherein the at least one switch comprises:

a light emitting diode operable to be coupled between the asymmetric digital subscriber line and the telephone and to illuminate only when the telephone is in an off-hook state; and a photo detector switch coupled to the attenuating capacitor and operable to conduct to couple the attenuating capacitor to the filter in response to the light emitting diode illuminating when the telephone is in an off-hook state.

12. The system of claim 9, wherein the change in corner frequency of the associated filter comprises a reduction in the corner frequency when a telephone coupled to the filter is operating in an off-hook state, the reduction in the corner frequency operating to attenuate parasitic interference associated with telephones in an on-hook state.

13. A method of communicating information using an asymmetric digital subscriber line, comprising:

coupling a filter between the asymmetric digital subscriber line and each of a plurality of telephones coupled to the asymmetric digital subscriber line, the filter operable to attenuate low frequency transients associated with ones of the telephones operating in an off-hook state; and adjusting the frequency response of each filter depending on whether the telephone coupled to the filter is in an on-hook state or an off-hook state, the change in the corner frequency operating to attenuate parasitic interference associated with telephones in an on-hook state when at least one of the plurality of telephones switches to an off-hook state.

14. The method of claim 13, wherein adjusting the frequency response of each filter comprises reducing the corner frequency of the filter in response to the telephone switching between an off-hook state and an on-hook state to attenuate parasitic interference associated with the telephone operating in an on-hook state.

15. The method of claim 14, wherein reducing the corner frequency of the filter comprises coupling a capacitor in parallel with the filter when the telephone switches to an off-hook state.

16. The method of claim 15, wherein coupling a capacitor in parallel with the filter comprises activating a switch coupled in series with the capacitor in response to the telephone switches to an off-hook state.

17. The method of claim 16, wherein the switch comprises:
   a light emitting diode operable to be coupled between the asymmetric digital subscriber line and the telephone and to illuminate only when the telephone is in an off-hook state; and
   a photo detector switch coupled to the attenuating capacitor and operable to conduct to couple the attenuating capacitor to the filter in response to the light emitting diode illuminating when the telephone is in an off-hook state.

18. A method of communicating information using an asymmetric digital subscriber line, the method comprising transmitting a signal over a communications network having an asymmetric digital subscriber line and a plurality of isolating circuits each disposed between one of a plurality of telephones and the asymmetric digital subscriber line, at least one isolating circuit comprising:
   a filter having a corner frequency and being operable to be coupled between one of the plurality of telephones and the asymmetric digital subscriber line, and to attenuate transients associated with at least another of the plurality of telephones operating in an off-hook state; and
   a switch coupled to the filter and operable to effect a change in the corner frequency of the associated filter depending on whether the one of the plurality of telephones coupled to the filter is operating in an on-hook or an off-hook state, the change in the corner frequency operating to attenuate parasitic interference associated with the one of the plurality of telephones in an on-hook state when the at least another of the plurality of telephones switches to an off-hook state.

19. In a system including a plurality of telephones coupled to an asymmetric digital subscriber line, a circuit operable to facilitate communication using the asymmetric digital subscriber line comprises:
   a filter having a corner frequency and being operable to be coupled between one of a plurality of telephones and an asymmetric digital subscriber line, and to attenuate transients associated with the telephone operating in an off-hook state; and
   a saturable core inductor coupled to the filter and comprising a core operable to saturate when exposed to a current associated with an off-hook state of an associated telephone increasing the corner frequency of the filter, and to remain discharged when exposed to a current associated with an on-hook state of the associated telephone decreasing the corner frequency of the filter to attenuate parasitic interference associated with telephones in an on-hook state.

20. The circuit of claim 19, wherein the core of the saturable core inductor comprises ferrite having a permeability of approximately 900$\mu$.

21. The circuit of claim 19, wherein the saturable core inductor comprises a non-gapped toroid.

22. A system operable to facilitate communications over an asymmetric digital subscriber line, comprising:
   a modem operable to be coupled to an asymmetric digital subscriber line to facilitate communication of data messages over the asymmetric digital subscriber line; and
   a plurality of filters, each having a corner frequency and being operable to be coupled between one of a plurality of telephones and the asymmetric digital subscriber line, and to attenuate transients associated with ones of the telephones operating in an off-hook state; and
   a plurality of saturable core inductors, each coupled to one of the plurality of filters, and each comprising a core operable to saturate when exposed to a current associated with an off-hook state of an associated telephone increasing the corner frequency of the filter, and to remain discharged when exposed to a current associated with an on-hook state of the associated telephone decreasing the corner frequency of the filter to attenuate parasitic interference associated with telephones in an on-hook state.

23. The system of claim 22, wherein the core of the saturable core inductor comprises ferrite having a permeability of approximately 900$\mu$.

24. The system of claim 22, wherein the saturable core inductor comprises a non-gapped toroid.

25. A method of communicating information using an asymmetric digital subscriber line, comprising:
   coupling a filter between the asymmetric digital subscriber line and each of a plurality of telephones coupled to the asymmetric digital subscriber line, the filter operable to attenuate low frequency transients associated with one of the telephones operating in an off-hook state; and
   coupling a saturable core inductor in series with the filter, the saturable core inductor operable to reduce the corner frequency of a filter coupled to at least one of the telephones operating in an on-hook state in response to that telephone switching to an on-hook state to attenuate parasitic interference associated with the filter coupled to that telephone operating in an on-hook state.

26. A method of communicating information using an asymmetric digital subscriber line, the method comprising transmitting a signal over a communications network having an asymmetric digital subscriber line and a plurality of isolating circuits each disposed between one of a plurality of telephones and the asymmetric digital subscriber line, at least one isolating circuit comprising:
   a filter having a corner frequency and being operable to be coupled between one of the plurality of telephones and the asymmetric digital subscriber line, and to attenuate transients associated with the telephone operating in an off-hook state; and
   a saturable core inductor coupled to the filter and comprising a core operable to saturate when exposed to a current associated with an off-hook state of an associated telephone increasing the corner frequency of the filter, and to remain discharged when exposed to a current associated with an on-hook state of the associated telephone decreasing the corner frequency of the filter to attenuate parasitic interference associated with telephones in an on-hook state.

* * * * *